US011797222B2

(12) United States Patent
Zeng et al.

(10) Patent No.: US 11,797,222 B2
(45) Date of Patent: Oct. 24, 2023

(54) READ DISTURB CHECKING METHOD, MEMORY STORAGE DEVICE AND MEMORY CONTROL CIRCUIT UNIT

(71) Applicant: PHISON ELECTRONICS CORP., Miaoli (TW)

(72) Inventors: Shih-Jia Zeng, Hsinchu (TW); Po-Cheng Su, Hsinchu (TW); Chih-Wei Wang, Tainan (TW); Wei Lin, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 153 days.

(21) Appl. No.: 17/577,012

(22) Filed: Jan. 17, 2022

(65) Prior Publication Data
US 2023/0195361 A1    Jun. 22, 2023

(30) Foreign Application Priority Data
Dec. 20, 2021 (TW) .................................. 110147804

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| 10,553,290 B1* | 2/2020 | Muchherla ............. G11C 29/52 |
| 2017/0277471 A1* | 9/2017 | Huang ................... G06F 3/0685 |
| 2020/0097211 A1* | 3/2020 | Alsasua ................. G06F 3/0659 |
| 2022/0179795 A1* | 6/2022 | Sharifi Tehrani ... G06F 11/1048 |
| 2022/0334754 A1* | 10/2022 | Hu ........................ G06F 3/0679 |
| 2023/0251795 A1* | 8/2023 | Disegni ................. G06F 3/0659 |
| | | 711/103 |

FOREIGN PATENT DOCUMENTS

| TW | 201716980 | 5/2017 |
| TW | 201734794 | 10/2017 |

OTHER PUBLICATIONS

"Office Action of Taiwan Counterpart Application", dated Nov. 4, 2022, p. 1-p. 19.

* cited by examiner

*Primary Examiner* — Jason W Blust
(74) *Attorney, Agent, or Firm* — JCIPRNET

(57) ABSTRACT

A read disturb checking method, a memory storage device, and a memory control circuit unit are provided. The method includes: updating first and second read counts of a first physical unit group according to a total read count of a read operation performed on physical programming units in the first physical unit group; scanning at least one first physical programming unit in a currently read physical erasing unit in response to determining the first read account is greater than a first read count threshold to obtain a first error bit amount; scanning all physical programming units in at least one first physical erasing unit in the first physical unit group in response to determining the second read account is greater than a second read count threshold to obtain a second error bit amount; performing a read disturb prevention operation according to the first or second error bit amount.

21 Claims, 5 Drawing Sheets

READ DISTURB CHECKING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 110147804, filed on Dec. 20, 2021. The entirety of the above-mentioned patent application is hereby incorporated by reference herein and made a part of this specification.

BACKGROUND

1. Technology Field

The invention relates to a memory management method, and more particularly to a read disturb checking method for a rewritable non-volatile memory module, a memory storage device, and a memory control circuit unit.

2. Description of Related Art

Portable electronic devices such as notebook computers and mobile phones have grown rapidly over the past few years, which has led to a rapid increase in consumer demand for storage media. Because rewritable non-volatile memory (for example, flash memory) has characteristics such as non-volatile data, power saving, small size, no mechanical structure, and fast read and write speed, rewritable non-volatile memory is very suitable for being built into the various portable electronic devices above. A solid-state disc is a memory storage device adopting flash memory module as storage medium. Therefore, the flash memory industry has become a relatively important part in the electronic industry in recent years.

In general, when the data stored in one physical programming unit in the physical erasing unit is read multiple times (for example, the read count reaches one hundred thousand to one million), the data stored in this physical programming unit is very likely to cause error bits or loss due to repeated application of read voltage to the memory cell, and may even cause error bits or loss of data stored in other physical programming units in the same physical erasing unit. This phenomenon is generally called "read disturb". How to deal with the issue of read disturb is actually one of the tasks those skilled in the art of the invention are committed to.

SUMMARY

The invention provides a read disturb checking method, a memory storage device, and a memory control circuit unit that may suppress the probability of occurrence of read disturb.

The invention provides a read disturb checking method for a rewritable non-volatile memory module. The rewritable non-volatile memory module includes a plurality of physical unit groups, wherein each of the plurality of physical unit groups includes a plurality of physical erasing units, and each of the plurality of physical erasing units includes a plurality of physical programming units. In particular, the plurality of physical unit groups include a first physical unit group. The method includes: performing a read operation on the plurality of physical programming units; updating a first read count and a second read count of the first physical unit group according to a total read count of the read operation performed on the plurality of physical programming units in the first physical unit group; determining whether the first read count is greater than a first read count threshold, and scanning at least one first physical programming unit in the currently read physical erasing unit in response to determining that the first read count is greater than the first read count threshold to obtain a first error bit amount; determining whether the second read count is greater than a second read count threshold, and scanning all of the plurality of physical programming units in at least one first physical erasing unit in the first physical unit group in response to determining that the second read count is greater than the second read count threshold to obtain a second error bit amount, wherein the second read count threshold is greater than the first read count threshold; and performing a read disturb prevention operation according to at least one of the first error bit amount and the second error bit amount.

In an embodiment of the invention, the step of scanning all of the plurality of physical programming units in the at least one first physical erasing unit in the first physical unit group to obtain the second error bit amount includes: obtaining an index corresponding to the first physical unit group, wherein the index reflects the physical erasing unit to be scanned in the first physical unit group; and scanning all of the plurality of physical programming units in the at least one first physical erasing unit corresponding to the index according to an indication of the index to obtain the second error bit amount.

In an embodiment of the invention, the method further includes: corresponding the index to the next physical erasing unit to be scanned after all of the plurality of physical programming units in the at least one first physical erasing unit are finished scanning.

In an embodiment of the invention, the method further includes: updating a third read count of the first physical unit group according to a total read count of the read operation performed on the plurality of physical programming units in the first physical unit group; and selecting the physical erasing unit that is not scanned in the first physical unit group for scanning when it is determined that the second read count is greater than the second read count threshold to scan at least one first physical erasing unit in the first physical unit group in response to determining that the third read count is not greater than a third read count threshold.

In an embodiment of the invention, the method further includes: calculating a scan average according to the second read count threshold and a number of the plurality of physical programming units in the first physical unit group; and generating the first read count threshold randomly according to the scan average.

In an embodiment of the invention, the step of performing the read disturb prevention operation includes: determining whether the first error bit amount is greater than a first error threshold; and copying a data stored in the currently read physical erasing unit to other physical erasing units in response to determining that the first error bit amount is greater than the first error threshold.

In an embodiment of the invention, the step of performing the read disturb prevention operation includes: determining whether the second error bit amount is greater than a second error threshold; and copying a data stored in the at least one physical erasing unit to other physical erasing units in response to determining that the second error bit amount is greater than the second error threshold.

The invention provides a memory storage device including a connection interface unit, a rewritable non-volatile memory module, and a memory control circuit unit. The connection interface unit is configured to be coupled to a host system. The rewritable non-volatile memory module includes a plurality of physical unit groups, wherein each of the plurality of physical unit groups includes a plurality of physical erasing units, and each of the plurality of physical erasing units includes a plurality of physical programming units. In particular, the plurality of physical unit groups include a first physical unit group. The memory control circuit unit is coupled to the connection interface unit and the rewritable non-volatile memory module. The memory control circuit unit is configured to perform a read operation on the plurality of physical programming units. The memory control circuit unit is further configured to update a first read count and a second read count of the first physical unit group according to a total read count of the read operation performed on the plurality of physical programming units in the first physical unit group. The memory control circuit unit is further configured to determine whether the first read count is greater than a first read count threshold, and scan at least one first physical programming unit in the currently read physical erasing unit in response to determining that the first read count is greater than the first read count threshold to obtain a first error bit amount. The memory control circuit unit is further configured to determine whether the second read count is greater than a second read count threshold, and scan all of the plurality of physical programming units in at least one first physical erasing unit in the first physical unit group in response to determining that the second read count is greater than the second read count threshold to obtain a second error bit amount. In particular, the second read count threshold is greater than the first read count threshold. Moreover, the memory control circuit unit is further configured to perform a read disturb prevention operation according to at least one of the first error bit amount and the second error bit amount.

In an embodiment of the invention, the memory control circuit unit is further configured to obtain an index corresponding to the first physical unit group, wherein the index reflects the physical erasing unit to be scanned in the first physical unit group. Moreover, the memory control circuit unit is further configured to scan all of the plurality of physical programming units in the at least one first physical erasing unit corresponding to the index according to an indication of the index to obtain the second error bit amount.

In an embodiment of the invention, the memory control circuit unit is further configured to correspond the index to the next physical erasing unit to be scanned after all of the plurality of physical programming units in the at least one first physical erasing unit are finished scanning.

In an embodiment of the invention, the memory control circuit unit is further configured to update a third read count of the first physical unit group according to a total read count of the read operation performed on the plurality of physical programming units in the first physical unit group. Moreover, the memory control circuit unit is further configured to select the physical erasing unit that is not scanned in the first physical unit group for scanning when it is determined that the second read count is greater than the second read count threshold to scan at least one first physical erasing unit in the first physical unit group in response to determining that the third read count is not greater than a third read count threshold.

In an embodiment of the invention, the memory control circuit unit is further configured to calculate a scan average according to the second read count threshold and a number of the plurality of physical programming units in the first physical unit group. Moreover, the memory control circuit unit is further configured to randomly generate the first read count threshold according to the scan average.

In an embodiment of the invention, the memory control circuit unit is further configured to determine whether the first error bit amount is greater than a first error threshold. Moreover, the memory control circuit unit is further configured to copy a data stored in the currently read physical erasing unit to other physical erasing units in response to determining that the first error bit amount is greater than the first error threshold.

In an embodiment of the invention, the memory control circuit unit is further configured to determine whether the second error bit amount is greater than a second error threshold. Moreover, the memory control circuit unit is further configured to copy a data stored in the at least one first physical erasing unit to other physical erasing units in response to determining that the second error bit amount is greater than the second error threshold.

The invention provides a memory control circuit unit configured to control a rewritable non-volatile memory module. The memory control circuit unit includes a host interface, a memory interface, and a memory management circuit. The host interface is configured to be coupled to the host system. The memory interface is configured to be coupled to the rewritable non-volatile memory module, wherein the rewritable non-volatile memory module includes a plurality of physical unit groups, each of the plurality of physical unit groups includes a plurality of physical erasing units, and each of the plurality of physical erasing units includes a plurality of physical programming units. In particular, the plurality of physical unit groups include a first physical unit group. The memory management circuit is coupled to the host interface and the memory interface. The memory management circuit is configured to perform a read operation on the plurality of physical programming units. The memory management circuit is further configured to update a first read count and a second read count of the first physical unit group according to a total read count of the read operation performed on the plurality of physical programming units in the first physical unit group. The memory management circuit is further configured to determine whether the first read count is greater than a first read count threshold, and scan at least one first physical programming unit in the currently read physical erasing unit in response to determining that the first read count is greater than the first read count threshold to obtain a first error bit amount. The memory management circuit is further configured to determine whether the second read count is greater than a second read count threshold, and scan all of the plurality of physical programming units in at least one first physical erasing unit in the first physical unit group in response to determining that the second read count is greater than the second read count threshold to obtain a second error bit amount, wherein the second read count threshold is greater than the first read count threshold. Moreover, the memory management circuit is further configured to perform a read disturb prevention operation according to at least one of the first error bit amount and the second error bit amount.

In an embodiment of the invention, the memory management circuit is further configured to obtain an index corresponding to the first physical unit group, wherein the index reflects the physical erasing unit to be scanned in the first physical unit group. Moreover, the memory management circuit is further configured to scan all of the plurality of physical programming units in the at least one first physical erasing unit corresponding to the index according to an indication of the index to obtain the second error bit amount.

In an embodiment of the invention, the memory management circuit is further configured to correspond the index to the next physical erasing unit to be scanned after all of the plurality of physical programming units in the at least one first physical erasing unit are finished scanning.

In an embodiment of the invention, the memory management circuit is further configured to update a third read count of the first physical unit group according to a total read count of the read operation performed on the plurality of physical programming units in the first physical unit group. Moreover, the memory management circuit is further configured to select the physical erasing unit that is not scanned in the first physical unit group for scanning when it is determined that the second read count is greater than the second read count threshold to scan at least one first physical erasing unit in the first physical unit group in response to determining that the third read count is not greater than a third read count threshold.

In an embodiment of the invention, the memory management circuit is further configured to calculate a scan average according to the second read count threshold and a number of the plurality of physical programming units in the first physical unit group. Moreover, the memory management circuit is further configured to randomly generate the first read count threshold according to the scan average.

In an embodiment of the invention, the memory management circuit is further configured to determine whether the first error bit amount is greater than a first error threshold. Moreover, the memory management circuit is further configured to copy a data stored in the currently read physical erasing unit to other physical erasing units in response to determining that the first error bit amount is greater than the first error threshold.

In an embodiment of the invention, the memory management circuit is further configured to determine whether the second error bit amount is greater than a second error threshold. Moreover, the memory management circuit is further configured to copy a data stored in the at least one first physical erasing unit to other physical erasing units in response to determining that the second error bit amount is greater than the second error threshold.

Based on the above, in the read disturb checking method, the memory storage device, and the memory control circuit unit provided by the embodiments of the invention, by grouping a plurality of physical erasing units into one physical unit group and by monitoring the read count of the physical unit group including a plurality of physical erasing units, the space for storing the read count is reduced. In addition, by setting two read count thresholds, the read count of each physical unit group is monitored to determine the scan range in the physical unit group. In this way, while reducing the space for storing the read count, the probability of occurrence of read disturb may be suppressed.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

DESCRIPTION OF THE EMBODIMENTS

In general, a memory storage device (also referred to as a memory storage system) includes a rewritable non-volatile memory module and a controller (also referred to as a control circuit). The memory storage device is generally used with a host system, such that the host system may write data into the memory storage device or read data from the memory storage device.

Figure 1:
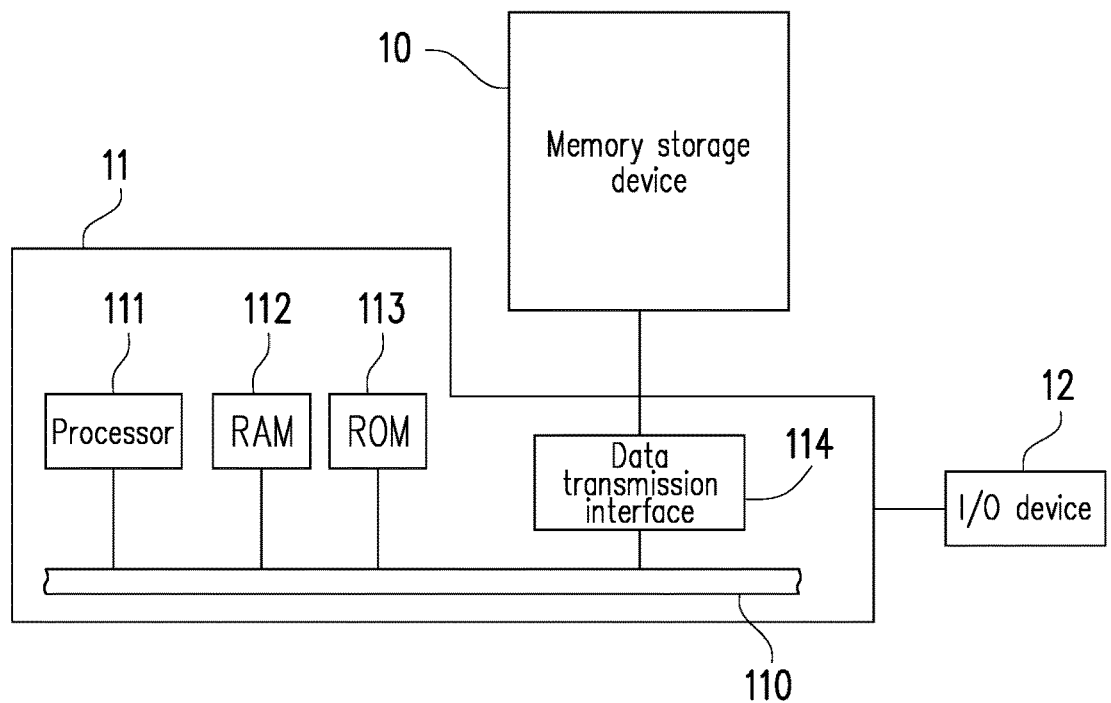
FIG. 1 is a schematic diagram of a host system, a memory storage device, and an input/output (I/O) device shown according to an exemplary embodiment of the invention.
Figure 2:
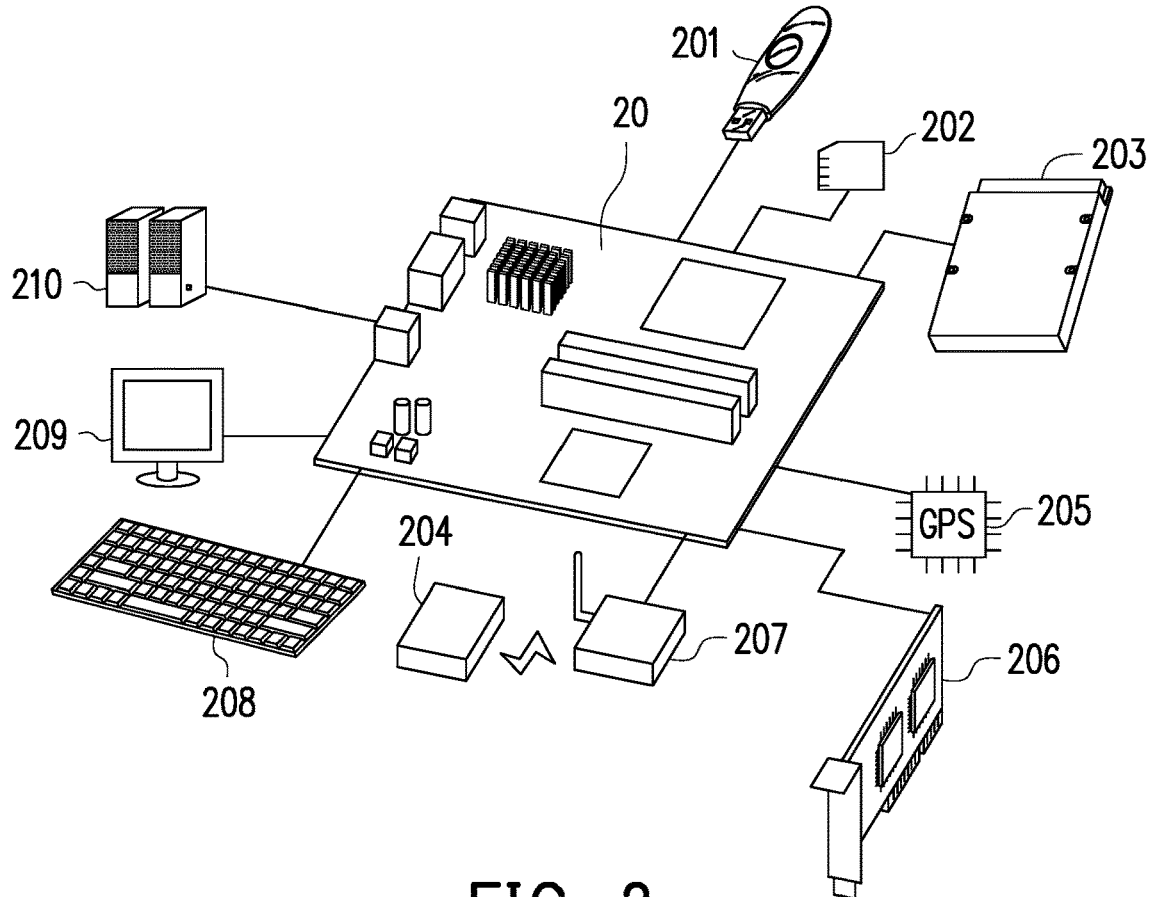
FIG. 2 is a schematic of a host system, a memory storage device, and an I/O device shown according to another exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to another exemplary embodiment of the invention.

Referring to FIG. 1 and FIG. 2, a host system 11 generally includes a processor 111, a random-access memory (RAM) 112, a read-only memory (ROM) 113, and a data transmission interface 114. The processor 111, the RAM 112, the ROM 113, and the data transmission interface 114 are all coupled to a system bus 110.

In the present exemplary embodiment, the host system 11 is coupled to the memory storage device 10 via the data transmission interface 114. For example, the host system 11 may store data into the memory storage device 10 or read data from the memory storage device 10 via the data transmission interface 114. Moreover, the host system 11 is coupled to the I/O device 12 via the system bus 110. For example, the host system 11 may send an output signal to the I/O device 12 or receive an input signal from the I/O device 12 via the system bus 110.

In the present exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114. The memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

Figure 3:
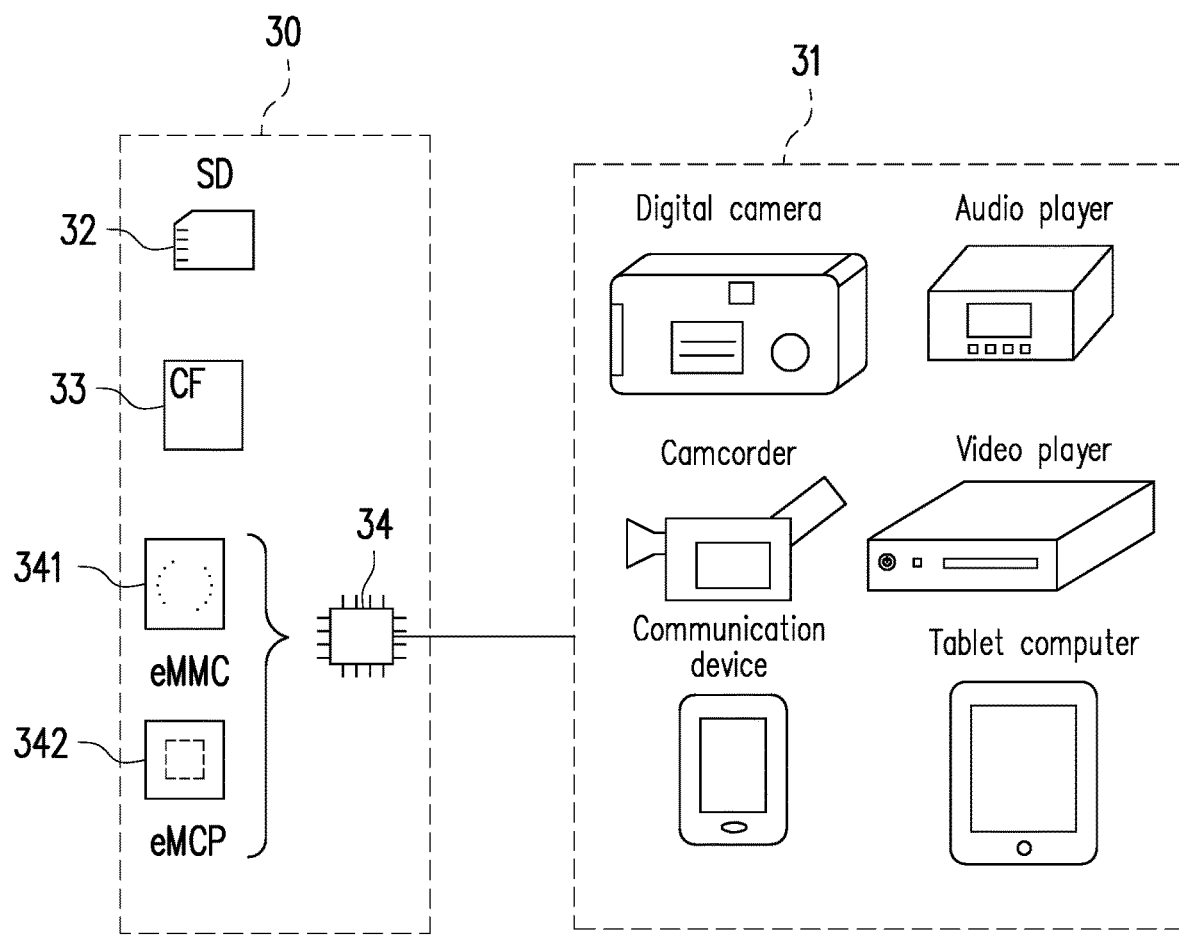
FIG. 3 is a schematic of a host system and a memory storage device shown according to another exemplary embodiment of the invention.

In an exemplary embodiment, the mentioned host system is any system that may substantially store data with the memory storage device. Although in the above exemplary embodiments, the host system is exemplified by a computer system, FIG. 3 is a schematic diagram of a host system and a memory storage device shown according to another exemplary embodiment of the invention. Referring to FIG. 3, in another exemplary embodiment, the host system 31 may also be a system such as a digital camera, a camcorder, a communication device, an audio player, a video player, or a tablet computer, and the memory storage device 30 may be various non-volatile memory storage devices used thereby such as an SD card 32, a CF card 33, or an embedded storage device 34. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
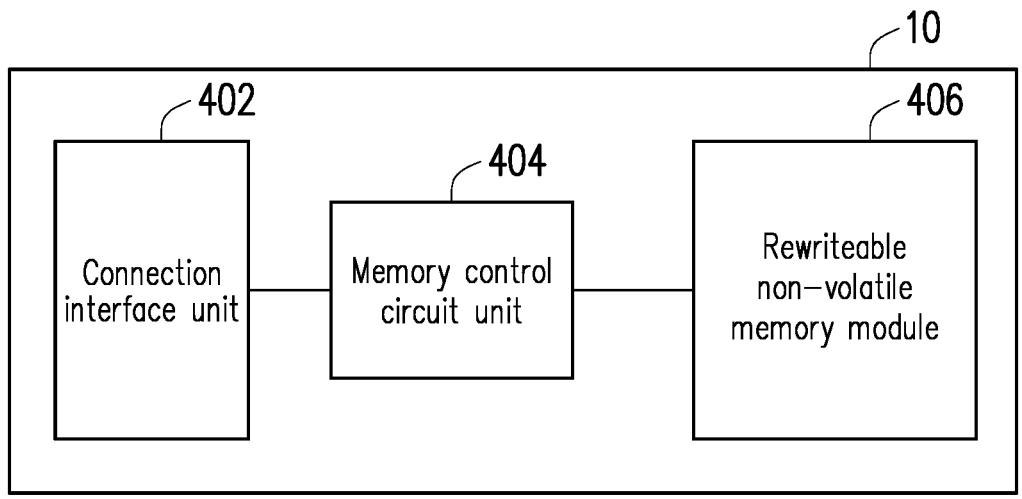
FIG. 4 is a schematic block diagram of a memory storage device shown according to an exemplary embodiment of the invention.

FIG. 4 is a schematic block diagram of a memory storage device shown according to an exemplary embodiment of the invention. Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 via the connection interface unit 402. In the present exemplary embodiment, the connection interface unit 402 is compatible with the serial advanced technology attachment (SATA) standard. However, it should be understood that the invention is not limited thereto, and the connection interface unit 402 may also comply with the Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 402 may be sealed in a chip with the memory control circuit unit 404. Alternatively, the connection interface unit 402 is disposed outside of a chip containing the memory control circuit unit 404.

The memory control circuit unit 404 is configured to execute a plurality of logic gates or control commands implemented in a hardware form or in a firmware form. The memory control circuit unit 404 also performs operations such as writing, reading, and erasing data in the rewritable non-volatile memory storage module 406 according to the commands of the host system 11.

The rewritable non-volatile memory module 406 is coupled to the memory control circuit unit 404 and configured to store data written by the host system 11. The rewritable non-volatile memory module 406 may be a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 406 stores one or a plurality of bits via the change in voltage (also referred to as threshold voltage hereinafter). Specifically, a charge trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 406 has a plurality of storage statuses. Which storage status one memory cell belongs to may be determined via the application of a read voltage, so as to obtain one or a plurality of bits stored by the memory cell.

In the present exemplary embodiment, the memory cells of the rewritable non-volatile memory module 406 may form a plurality of physical programming units, and these physical programming units may form a plurality of physical erasing units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the data write speed of the lower physical programming unit is greater than the data write speed of the upper physical programming units, and/or the reliability of the lower physical programming units is greater than the reliability of the upper physical programming units.

In the present exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundant bit area. The data bit area contains a plurality of physical pages configured to store user data, and the redundant bit area is configured to store system data (for example, management data such as an ECC). In the present exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erasing units contains the smallest number of memory cells erased together. For example, the physical erasing unit is a physical block.

Figure 5:
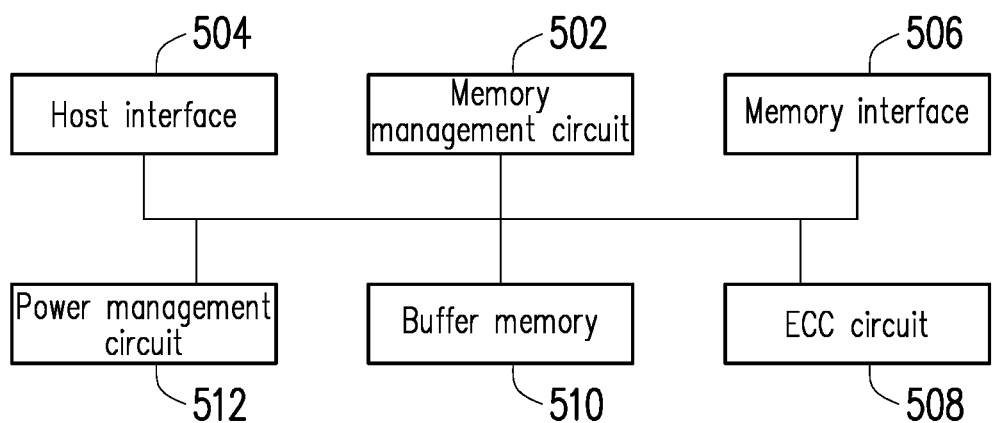
FIG. 5 is a schematic block diagram of a memory control circuit unit shown according to an exemplary embodiment of the invention.

FIG. 5 is a schematic block diagram of a memory control circuit unit shown according to an exemplary embodiment of the invention. Referring to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands. During operation of the memory storage device 10, the control commands are executed to perform operations such as writing, reading, and erasing data. In the following, descriptions relating to the operation of the memory management circuit 502 are equivalent to the descriptions of the operation of the memory control circuit unit 404.

In the present exemplary embodiment, the control commands of the memory management circuit 502 are implemented in a firmware form. For example, the memory management circuit 502 has a microprocessor unit (not shown) and a read-only memory (not shown), and the control instructions are burned into the ROM. During the operation of the memory storage device 10, the control commands are executed by the microprocessor unit to perform operations such as writing, reading, and erasing data.

In another exemplary embodiment, the control commands of the memory management circuit 502 may also be stored in the form of program codes in a specific area (for example, the system area in a memory module exclusively configured to store system data) of the rewritable non-volatile memory module 406. Moreover, the memory management circuit 502 has a microprocessor unit (not shown), a ROM (not shown), and a RAM (not shown). In particular, the ROM has a boot code, and when the memory control circuit unit 404 is enabled, the microprocessor unit first executes the boot code to load the control commands stored in the rewritable non-volatile memory module 406 into the RAM of the memory management circuit 502. Next, the microprocessor unit runs the control commands to perform operations such as writing, reading, and erasing data.

Further, in another exemplary embodiment, the control commands of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 406. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. The write command sequence, the read command sequence, and the erase command sequence may independently include one or a plurality of program codes or command codes and be configured to instruct the rewritable non-volatile memory module 406 to execute corresponding operations such as writing, reading, and erasing. In an exemplary embodiment, the memory management circuit 502 may also issue other types of command sequences to the rewritable non-volatile memory module 406 to instruct the execution of corresponding operations.

The host interface 504 is coupled to the memory management circuit 502. The memory management circuit 502 may communicate with the host system 11 via the host interface 504. The host interface 504 may be used to receive and identify commands and data sent by the host system 11. For example, the commands and data sent by the host system 11 may be sent to the memory management circuit 502 via the host interface 504. In addition, the memory management circuit 502 may send data to the host system 11 via the host interface 504. In the present exemplary embodiment, the host interface 504 is compatible with the SATA standard. However, it should be understood that the invention is not limited thereto, and the host interface 504 may also be compatible with the PATA standard, IEEE 1394 standard, PCI Express standard, USB standard, SD standard, UHS-I standard, UHS-II standard, MS standard, MMC standard, eMMC standard, UFS standard, CF standard, IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted to a format acceptable to the rewritable non-volatile memory module 406 via the memory interface 506. Specifically, if the memory management circuit 502 is to access the rewritable non-volatile memory module 406, the memory interface 506 sends a corresponding command sequence. For example, the command sequence may include a write command sequence instructing data writing, a read command sequence instructing data reading, an erase command sequence instructing data erasing, and corresponding command sequences configured to instruct various memory operations (such as changing read voltage level or executing a garbage collection operation). The command sequence is generated by, for example, the memory management circuit 502 and sent to the rewritable non-volatile memory module 406 via the memory interface 506. The command sequence may include one or a plurality of signals or data on a bus. The signals or data may include a command code or a program code. For example, when reading a command sequence, information such as read identification code or memory address is included.

In an exemplary embodiment, the memory control circuit unit 404 further includes an error detecting and correcting circuit 508, a buffer memory 510, and a power management circuit 512.

The error detecting and correcting circuit 508 is coupled to the memory management circuit 502 and configured to execute an error detecting and correcting operation to ensure the correctness of data. Specifically, when the memory management circuit 502 receives a write command from the host system 11, the error detecting and correcting circuit 508 generates a corresponding error correcting code (ECC) and/or an error detecting code (EDC) for data corresponding to the write command, and the memory management circuit 502 writes the data corresponding to the write command and the corresponding ECC and/or EDC into the rewritable non-volatile memory module 406. Next, when reading data from the rewritable non-volatile memory module 406, the memory management circuit 502 reads the ECC and/or the EDC corresponding to the data at the same time, and the error detecting and correcting circuit 508 executes an error detecting and correcting operation on the read data based on the ECC and/or the EDC.

The buffer 510 is coupled to the memory management circuit 502 and configured to temporarily store data and commands from the host system 11 or data from the rewritable non-volatile memory module 406. The buffer memory 510 may be a static random-access memory (SRAM), a dynamic random-access memory (DRAM), etc., and the invention is not limited in this regard. The power management circuit 512 is coupled to the memory management circuit 502 and configured to control the power of the memory storage device 10.

In an exemplary embodiment, the rewritable non-volatile memory module 406 of FIG. 4 is also referred to as a flash memory module, and the memory control circuit unit 404 is also referred to as a flash memory controller configured to control the flash memory module. In an exemplary embodiment, the memory management circuit 502 of FIG. 5 is also referred to as a flash memory management circuit.

Figure 6:
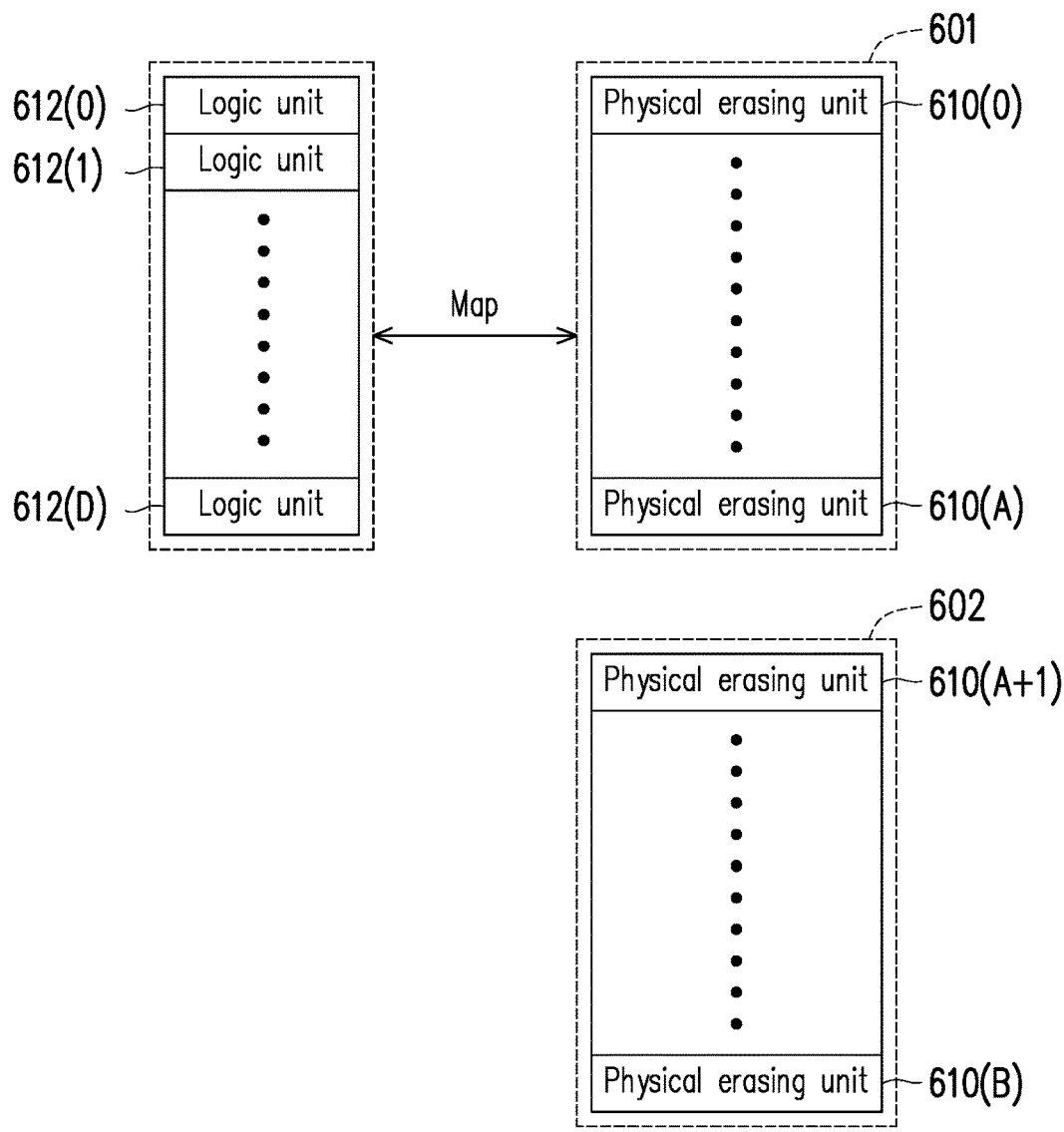
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention. It should be understood that, in the description of the operation of the physical units of the rewritable non-volatile memory module 406, operating the physical units via terms such as "extracting", "grouping", "dividing", and "associating" is a logical concept. In other words, the actual locations of the physical units of the rewritable non-volatile memory module are not changed, and instead operation is logically performed on the physical units.

Referring to FIG. 6, the memory management circuit 502 may logically group physical units 610(0) to 610(B) of the rewritable non-volatile memory module 406 into a storage area 601 and a free area 602. The physical units 610(0) to 610(A) in the storage area 601 and the physical units 610(A+1) to 610(B) in the free area 602 are configured to store data from the host system 11. Specifically, the physical units of the storage area 601 are regarded as physical units in which data is stored, and the physical units of the free area 602 are configured to substitute the physical units of the storage area 601. That is to say, when receiving the write command and the data to be written from the host system 11, the memory management circuit 502 uses the physical unit extracted from the free area 602 to write the data to replace the physical unit in the storage area 601.

In the present exemplary embodiment, each physical unit refers to one physical erasing unit. However, in another exemplary embodiment, one physical unit may also refer to one physical address, one physical programming unit, or be formed by a plurality of continuous or discontinuous physical addresses. The memory management circuit 502 configures logic units 612(0) to 612(C) to map the physical erasing units 610(0) to 610(A) in the storage area 601. In the present exemplary embodiment, each of the logic units refers to one logical address. However, in another exemplary embodiment, one logic unit may also refer to one logical programming unit, one logical erasing unit, or formed by a plurality of continuous or discontinuous logical addresses. In addition, each of the logic units 612(0) to 612(C) may be mapped to one or a plurality of physical erasing units.

The memory management circuit 502 may record the mapping relationship between the logic units and the physical erasing units (also referred to as a logical-physical address mapping relationship) in at least one logical-physical address mapping table. When the host system 11 is to read data from the memory storage device 10 or write data to the memory storage device 10, the memory management circuit 502 may execute a data access operation on the memory storage device 10 according to the logical-physical address mapping table.

It should be mentioned that, assuming that the data stored in the physical programming units in the physical erasing unit 610(0) is read by the memory management circuit 502 multiple times (for example, the read count reaches one hundred thousand to one million times), since the memory management circuit 502 applies a read voltage to the memory cells in the physical programming units in every read operation, the data stored in the physical programming units is very likely to generate error bits or be lost due to repeated application of read voltage to the memory cell. Furthermore, the data stored in other physical programming units in the physical erasing unit 610(0) may generate error bits or be lost. This results in the "read disturb" issue.

In an exemplary embodiment, data error or loss caused by read disturb may be avoided by determining whether the "read count" is greater than a preset threshold. Taking the above example of the memory management circuit 502 repeatedly reading the physical erasing unit 610(0), the memory management circuit 502 may record the number of times the data corresponding to the physical erasing unit 610(0) is read (i.e., the read count). The memory management circuit 502 may determine whether the read count is greater than a preset threshold to determine whether to move the data stored in the physical erasing unit 610(0). If the read count of the physical erasing unit 610(0) is greater than the preset threshold, the memory management circuit 502 moves the data in the physical erasing unit 610(0) to, for example, other free physical erasing units to prevent the data originally stored in the physical erasing unit 610(0) from being read repeatedly and resulting in excessive error bits or data loss.

In addition, the read count of the physical erasing unit 610(0) may also be used to determine whether to scan the physical erasing unit 610(0). Specifically, if it is determined to scan the physical erasing unit 610(0), the memory management circuit 502 may scan all of the physical programming units in the physical erasing unit 610(0), in order to obtain the "error bit amount" corresponding to the physical erasing unit 610(0). The memory management circuit 502 may determine whether the error bit amount is greater than a preset threshold to determine whether to move the data stored in the physical erasing unit 610(0). If the error bit amount of the read data read from the physical erasing unit 610(0) is greater than the preset threshold, the memory management circuit 502 moves the data in the physical erasing unit 610(0) to, for example, other free physical erasing units to prevent the data stored in the physical erasing unit 610(0) from being read repeatedly and resulting in more error bits or data loss.

However, it should be noted that in the previous method of recording the read count of the physical erasing units to avoid read disturb, recording the read count of each physical erasing unit occupies a large amount of storage space. Accordingly, the invention provides a read disturb checking method that may group a plurality of physical erasing units into one physical unit group and monitor the read count of this physical unit group to determine the timing of scanning the physical programming unit and the number of physical programming units to be scanned. In this way, while reducing the space for storing the read count, the probability of occurrence of read disturb may be suppressed.

Figure 7:
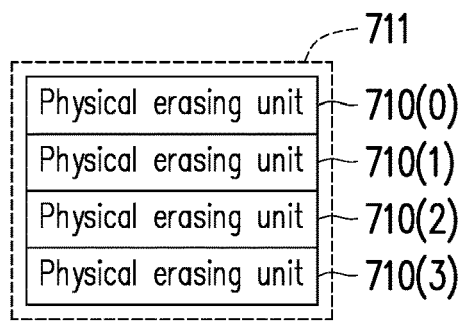
FIG. 7 is a schematic diagram of a physical unit group shown according to an exemplary embodiment of the invention.

In an exemplary embodiment, the memory management circuit 502 groups a plurality of physical erasing units into physical unit groups. In other words, these physical erasing units may form a plurality of physical unit groups, each of the physical unit groups includes a plurality of physical erasing units, and each of the physical erasing units includes a plurality of physical programming units. In particular, the physical unit group is, for example, one die or plane or a group formed by a plurality of other physical erasing units, and the invention is not limited in this regard. FIG. 7 is a schematic diagram of a physical unit group shown according to an exemplary embodiment of the invention. Please refer to FIG. 7, a physical unit group 711 includes four physical erasing units, namely, physical erasing units 710(0), 710(1), 710(2), and 710(3) shown in FIG. 7. However, FIG. 7 is only an example, and the invention does not limit the number of physical erasing units included in each physical unit group here.

In an exemplary embodiment, the memory storage device 10 may receive a read command from the host system 11. The memory management circuit 502 performs a read operation on the physical programming unit corresponding to the read command in the rewritable non-volatile memory module 406 according to the received read command to read the relevant data from the rewritable non-volatile memory module 406.

In the present exemplary embodiment, the memory management circuit 502 records the read count of each physical unit group. Specifically, the memory management circuit 502 may update two count values of the physical unit group according to the total read count of the read operation performed on the plurality of physical programming units in the physical unit group (for example, the first physical unit group). These count values include the first read count and the second read count.

For example, the memory management circuit 502 may store a read count table in the rewritable non-volatile memory module 406 to record the read count of each physical unit group. In addition, the memory management circuit 502 loads the read count table into the buffer memory 510 for maintenance. However, the invention is not limited to recording the read count in a look-up table. The memory management circuit 502 may correspondingly record (or update) the first read count and the second read count of the physical unit group to which the physical programming unit on which the read operation is performed belongs in the read count table every time the memory management circuit 502 performs a read operation on the physical programming unit. Taking the first physical unit group as an example, when any one or a plurality of physical programming units in the first physical unit group are read, the memory management circuit 502 may respectively add the first read count and the second read count of the first physical unit group to the total read count according to the total read count of the physical programming unit(s). For example, when any one physical programming unit in the first physical unit group is read, the memory management circuit 502 may increase the first read count and the second read count of the first physical unit group by 1 respectively.

In an exemplary embodiment, the memory management circuit 502 may determine whether the first read count is greater than a preset threshold (also referred to as the first read count threshold). In response to determining that the first read count is greater than the first read count threshold, the memory management circuit 502 scans at least one physical programming unit (for example, the first physical programming unit) in the currently read physical erasing unit to obtain the error bit amount (also known as the first error bit amount) of the scanned physical programming unit. For example, the memory management circuit 502 may randomly select any one or a plurality of physical programming units from the currently read physical erasing unit for scanning. In the present exemplary embodiment, after the scanning is performed, the memory management circuit 502 may reset the first read count to re-count the first read count of the physical unit group. For example, when reading data from a certain physical programming unit in the physical erasing unit 710(0), if the memory management circuit 502 determines the first read count of the physical unit group 711 to which the physical erasing unit 710(0) belongs to is greater than the first read count threshold, the memory management circuit 502 may scan at least one physical programming unit in the currently read physical erasing unit 710(0) to obtain the first error bit amount of the scanned physical programming unit.

Moreover, the memory management circuit 502 may determine whether the second read count is greater than another preset threshold (also referred to as the second read count threshold). In response to determining that the second read count is greater than the second read count threshold, the memory management circuit 502 scans all of the physical programming units in at least one physical erasing unit (for example, the first physical erasing unit) in the physical unit group to obtain the error bit amount (also known as the second error bit amount) of these physical programming units. In the present exemplary embodiment, after the scanning is performed, the memory management circuit 502 may reset the second read count to re-count the second read count of the physical unit group. In particular, the second read count threshold is greater than the first read count threshold.

For example, when reading data from a certain physical programming unit in the physical erasing unit 710(0), if the memory management circuit 502 determines the second read count of the physical unit group 711 to which the physical erasing unit 710(0) belongs to is greater than the second read count threshold, the memory management circuit 502 may scan all of the physical programming units in at least one physical erasing unit in the physical unit group 711 to obtain the second error bit amount of these physical programming units.

In an exemplary embodiment, the memory management circuit 502 may set an index corresponding to each physical unit group to correspond the index to the physical erasing unit to be scanned in the physical unit group. In other words, this index reflects the physical erasing unit to be scanned. In the present exemplary embodiment, when the memory management circuit 502 determines that the second read count of a certain physical unit group is greater than the second read count threshold and scans the physical erasing unit in the physical unit group, the index corresponding to the physical unit group may be obtained, and the physical erasing unit corresponding to the index may be scanned according to the indication of the index. Moreover, after the physical erasing unit is finished scanning, the memory management circuit 502 corresponds the index to the next physical erasing unit of the scanned physical erasing unit (as the physical erasing unit to be scanned). It is worth noting that if the index indicates that a plurality of physical erasing units are scanned, after these physical erasing units are finished scanning, the memory management circuit 502 corresponds the index to the next physical erasing unit of the last scanned physical erasing unit (as the physical erasing unit to be scanned).

Taking FIG. 7 as an example, it is assumed that the index corresponding to the physical unit group 711 corresponds to the physical erasing unit 710(0). If the memory management circuit 502 determines that the second read count of the physical unit group 711 is greater than the second read count threshold and scans the physical erasing unit in the physical unit group 711, the memory management circuit 502 scans the physical erasing unit 710(0), and changes the index to correspond to the next physical erasing unit to be scanned. For example, the memory management circuit 502 sequentially changes the index to correspond to the physical erasing unit 710(1). In the present exemplary embodiment, the memory management circuit 502 may scan the physical erasing units 710(0), 710(1), 710(2), and 710(3) sequentially after performing a plurality of scan operations according to the index. As a result, the memory management circuit 502 may ensure that within a specific number of times the physical unit group is read (in this example, four times the second read count threshold), each physical erasing unit in the physical unit group 711 is scanned.

It should be mentioned that, the memory management circuit 502 may also not determine the physical erasing unit to be scanned according to the order, as long as the memory management circuit 502 is set to scan all of the physical erasing units (in the present example, there are four physical erasing units) in the physical unit group within a certain read count (in the present example, four times the second read count threshold), and the invention is not limited in this regard. For example, the memory management circuit 502 may record the third read count of each physical unit group, and similar to the first read count and the second read count, the third read count is updated according to the total read count of the read operation performed on the plurality of physical programming units in the physical unit group. The memory management circuit 502 may set a third read count threshold for each physical unit group, and determine whether the third read count is greater than the third read count threshold. In response to determining that the third read count is not greater than the third read count threshold, when the memory management circuit 502 determines that the second read count is greater than the second read count threshold and scans at least one physical erasing unit in the physical unit group, the memory management circuit 502 selects the physical erasing unit that is not scanned in the physical unit group for scanning. In response to determining that the third read count is greater than the third read count threshold, the memory management circuit 502 resets the scanned physical erasing unit in the physical unit group to an unscanned state, and resets the third read count to perform the next round of read disturb checking operation on the physical unit group.

Take FIG. 7 as an example, it is assumed that the memory management circuit 502 scans the physical erasing unit 710(0) in the physical unit group 711 when the second read count of the physical unit group 711 is greater than the second read count threshold, and resets the second read count of the physical unit group 711 after scanning. When the next time the memory management circuit 502 determines that the second read count of the physical unit group 711 is greater than the second read count threshold and the third read count of the physical unit group 711 is not greater than the third read count threshold, the memory management circuit 502 selects the physical erasing units 710(1), 710(2), and 710(3) that are not scanned for scanning. In the present exemplary embodiment, after the memory management circuit 502 performs four scan operations on the physical unit group 711, the memory management circuit 502 scans all of the physical erasing units 710(0), 710(1), 710(2), 710(3) in the physical unit group 711. As a result, the memory management circuit 502 may ensure that within a specific number of times the physical unit group is read (in this example, four times the second read count threshold, that is, the third read count threshold), each physical erasing unit in the physical unit group 711 is scanned.

In addition, the memory management circuit 502 may calculate the third read count threshold according to the second read count threshold and the number of physical erasing units in the physical unit group. For example, the memory management circuit 502 may multiply the second read count threshold by the number of physical erasing units in the physical unit group to obtain the third read count threshold. Taking FIG. 7 as an example, it is assumed that the physical unit group 711 includes four physical erasing units, and the memory management circuit 502 sets the second read count threshold to 2KK. The memory management circuit 502 multiplies the second read count threshold (for example, 2KK) by the total number of physical erasures (for example, 4) to obtain a third read count threshold of 8KK. Since the memory management circuit 502 does not select the scanned physical erasing unit for scanning within reading 8KK times, after reading 8KK times, the memory management circuit 502 of the present exemplary embodiment may scan all of the physical programming units in all of the physical erasing units 710(0), 710(1), 710(2), and 710(3) in the physical unit group 711.

In an exemplary embodiment, the memory management circuit 502 may set the first read count threshold and the second read count threshold for each physical unit group. Specifically, the memory management circuit 502 may set the second read count threshold, and calculate the scan average according to the second read count threshold and the number of physical programming units in the physical unit group. For example, the scan average may be calculated using the following equation (1):

$$AVG1 = TH2/P\_Num1 \qquad (1)$$

In particular, AVG1 is the scan average, TH2 is the second read count threshold, and P_Num1 is the total number of physical programming units in one physical unit group.

In addition, the memory management circuit 502 may also calculate the scan average according to the second read count threshold and the number of physical programming units in the physical erasing unit, and the invention is not limited in this regard. For example, the scan average may be calculated using the following equation (2):

$$AVG2 = TH2/P\_Num2 \qquad (2)$$

In particular, AVG2 is the scan average, TH2 is the second read count threshold, and P_Num2 is the total number of physical programming units in one physical erasing unit.

The memory management circuit 502 may randomly generate the first read count threshold according to the scan average. For example, the memory management circuit 502 may determine a value range according to the scan average, and randomly generate the first read count threshold in this value range. Taking FIG. 7 as an example, it is assumed that the four physical erasing units included in the physical unit group 711 include a total of 1K physical programming units, and the memory management circuit 502 sets the second read count threshold to 2KK. The memory management circuit 502 can, for example, divide the second read count threshold (for example, 2KK) by the total number of physical programming units (for example, 1K) to generate the scan average, and the first read count threshold is randomly generated between 0.5 times the scan average and 1.5 times the scan average.

In an exemplary embodiment, the memory management circuit 502 may obtain the error bit amount of the physical programming units according to known error detection means, such as the first error bit amount and the second error bit amount above. Specifically, the memory management circuit 502 scans the physical programming units to obtain the data stored in the physical programming units, and at the same time reads the ECC and/or EDC corresponding to the data. The memory management circuit 502 performs an error detecting and correcting operation according to the data acquired by the ECC and/or EDC using the error detecting and correcting circuit 508, so as to calculate the error bit amount of the physical programming units according to the number of error bits of the data stored in the physical programming units.

In addition, the memory management circuit 502 may also perform a read disturb prevention operation according to at least one of the first error bit amount and the second error bit amount. Specifically, the read disturb operation includes determining whether the error bit amount is greater than a preset threshold (also referred to as an error threshold) to determine whether to move (copy) the data.

Taking the first error bit amount as an example, the memory management circuit 502 may determine whether the first error bit amount is greater than the first error threshold. In response to determining that the first error bit amount is greater than the first error threshold, the memory management circuit 502 may copy the data stored in the physical erasing unit to which the scanned physical programming unit belongs (i.e., the currently read physical erasing unit) to other physical erasing units. Taking the second error bit amount as an example, the memory management circuit 502 may determine whether the second error bit amount is greater than the second error threshold. In response to determining that the second error bit amount is greater than the second error threshold, the memory management circuit 502 may copy the data stored in the scanned physical erasing unit to other physical erasing units. Therefore, error bits caused by the read disturb generated from reading the physical erasing units in a large amount may be removed.

Figure 8:
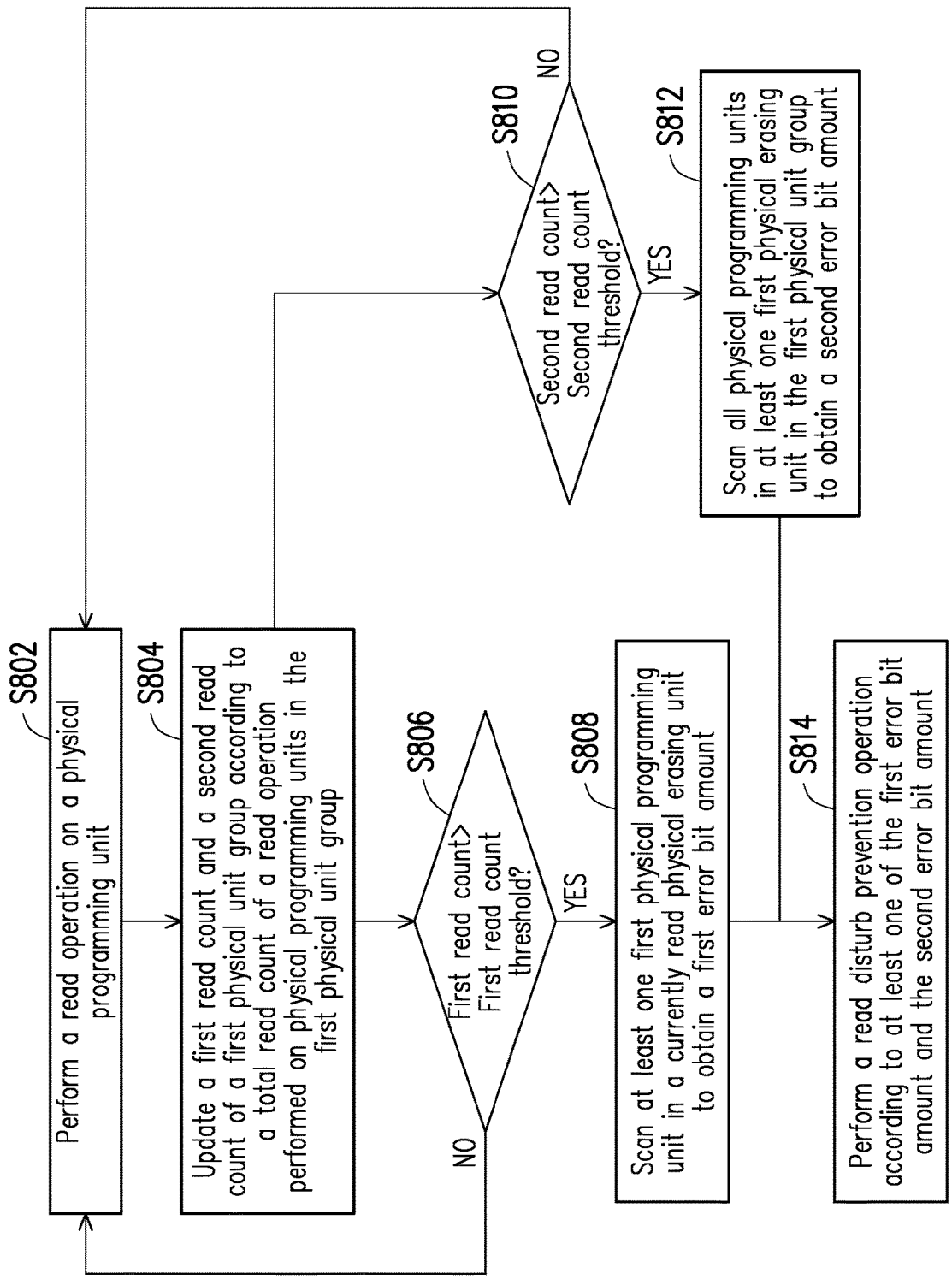
FIG. 8 is a flowchart of a read disturb checking method shown according to an exemplary embodiment of the invention.

FIG. 8 is a flowchart of a read disturb checking method shown according to an exemplary embodiment of the invention.

Referring to FIG. 8, in step S802, a read operation is performed on the physical programming units. In step S804, a first read count and a second read count of the first physical unit group are updated according to a total read count of the read operation performed on the physical programming units in the first physical unit group. In step S806, it is determined whether the first read count is greater than the first read count threshold. If it is determined that the first read count is greater than the first read count threshold (that is, the determination in step S806 is "Yes"), then in step S808, at least one first physical programming unit in the currently read physical erasing unit is scanned to obtain the first error bit amount. If it is determined that the first read count is not greater than the first read count threshold (i.e., the determination in step S806 is "No"), then step S802 is repeated to wait for the read operation to be performed. In step S810, it is determined whether the second read count is greater than the second read count threshold. If it is determined that the second read count is greater than the second read count threshold (i.e., the determination in step S810 is "Yes"), then in step S812, all of the physical programming units in at least one first physical erasing unit in the first physical unit group are scanned to obtain the second error bit amount. If it is determined that the second read count is not greater than the second read count threshold (i.e., the determination in step S810 is "No"), then step S802 is repeated to wait for the read operation to be performed. In step S814, a read disturb prevention operation is performed according to at least one of the first error bit amount and the second error bit amount.

However, each step in FIG. 8 is as described in detail above, and is not repeated herein. It should be mentioned that, each step in FIG. 8 may be implemented as a plurality of program codes or circuits, and the invention is not limited in this regard. Moreover, the method of FIG. 8 may be used with the above exemplary embodiments, and may also be used alone, and the invention is not limited in this regard.

Based on the above, in the read disturb checking method, the memory storage device, and the memory control circuit unit provided by the embodiments of the invention, by grouping a plurality of physical erasing units into one physical unit group and setting two read count thresholds to monitor the read count of each physical unit group, the scan range in the physical unit group is determined. Accordingly, while the read count of a physical unit group including a plurality of physical erasing units is monitored to reduce the space storing the read count, the probability of occurrence of read disturb may still be suppressed.

Specifically, in an embodiment of the invention, monitoring the read count of a physical unit group may take up less storage space than monitoring the read count of each of the physical erasing units. Moreover, in an embodiment of the invention, a first read count threshold with a smaller value is used to determine the timing of checking the physical programming unit randomly selected in the currently read physical erasing unit to reduce the time spent scanning the entire physical erasing unit. Moreover, an embodiment of the invention also uses a second read count threshold with a larger value to determine the timing of checking all of the physical programming units in any physical erasing unit in the physical unit group. Therefore, the probability of occurrence of read disturb caused by scanning only a portion of the physical programming unit may be avoided, thereby suppressing the probability of occurrence of read disturb.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A read disturb checking method, configured for a rewritable non-volatile memory module, wherein the rewritable non-volatile memory module comprises a plurality of physical unit groups, each of the plurality of physical unit groups comprises a plurality of physical erasing units, each of the plurality of physical erasing units comprises a plurality of physical programming units, the plurality of physical unit groups comprise a first physical unit group, and the method comprises:

performing a read operation on the plurality of physical programming units;

updating a first read count and a second read count of the first physical unit group according to a total read count of the read operation performed on the plurality of physical programming units in the first physical unit group;

determining whether the first read count is greater than a first read count threshold, and scanning at least one first physical programming unit in the currently read physical erasing unit in response to determining that the first read count is greater than the first read count threshold to obtain a first error bit amount;

determining whether the second read count is greater than a second read count threshold, and scanning all of the plurality of physical programming units in at least one first physical erasing unit in the first physical unit group in response to determining that the second read count is greater than the second read count threshold to obtain a second error bit amount, wherein the second read count threshold is greater than the first read count threshold; and performing a read disturb prevention operation according to at least one of the first error bit amount and the second error bit amount.

2. The read disturb checking method of claim 1, wherein the step of scanning all of the plurality of physical programming units in the at least one first physical erasing unit in the first physical unit group to obtain the second error bit amount comprises:

obtaining an index corresponding to the first physical unit group, wherein the index reflects the physical erasing unit to be scanned in the first physical unit group; and scanning all of the plurality of physical programming units in the at least one first physical erasing unit corresponding to the index according to an indication of the index to obtain the second error bit amount.

3. The read disturb checking method of claim 2, wherein the method further comprises:

corresponding the index to the next physical erasing unit to be scanned after all of the plurality of physical programming units in the at least one first physical erasing unit are finished scanning.

4. The read disturb checking method of claim 1, wherein the method further comprises:

updating a third read count of the first physical unit group according to a total read count of the read operation performed on the plurality of physical programming units in the first physical unit group; and selecting the physical erasing unit that is not scanned in the first physical unit group for scanning when it is determined that the second read count is greater than the second read count threshold to scan at least one first physical erasing unit in the first physical unit group in response to determining that the third read count is not greater than a third read count threshold.

5. The read disturb checking method of claim 1, wherein the method further comprises:

calculating a scan average according to the second read count threshold and a number of the plurality of physical programming units in the first physical unit group; and generating the first read count threshold randomly according to the scan average.

6. The read disturb checking method of claim 1, wherein the step of performing the read disturb prevention operation comprises:

determining whether the first error bit amount is greater than a first error threshold; and copying a data stored in the currently read physical erasing unit to other physical erasing units in response to determining that the first error bit amount is greater than the first error threshold.

7. The read disturb checking method of claim 1, wherein the step of performing the read disturb prevention operation comprises:

determining whether the second error bit amount is greater than a second error threshold; and copying a data stored in the at least one first physical erasing unit to other physical erasing units in response to determining that the second error bit amount is greater than the second error threshold.

8. A memory storage device, comprising:

a connection interface unit configured to be coupled to a host system;

a rewritable non-volatile memory module comprising a plurality of physical unit groups, wherein each of the plurality of physical unit groups comprises a plurality of physical erasing units, each of the plurality of physical erasing units comprises a plurality of physical programming units, and the plurality of physical unit groups comprise a first physical unit group; and a memory control circuit unit coupled to the connection interface unit and the rewritable non-volatile memory module, wherein the memory control circuit unit is configured to perform a read operation on the plurality of physical programming units, the memory control circuit unit is further configured to update a first read count and a second read count of the first physical unit group according to a total read count of the read operation performed on the plurality of physical programming units in the first physical unit group, the memory control circuit unit is further configured to determine whether the first read count is greater than a first read count threshold, and scan at least one first physical programming unit in the currently read physical erasing unit in response to determining that the first read count is greater than the first read count threshold to obtain a first error bit amount, the memory control circuit unit is further configured to determine whether the second read count is greater than a second read count threshold, and scan all of the plurality of physical programming units in at least one first physical erasing unit in the first physical unit group in response to determining that the second read count is greater than the second read count threshold to obtain a second error bit amount, wherein the second read count threshold is greater than the first read count threshold, and the memory control circuit unit is further configured to perform a read disturb prevention operation according to at least one of the first error bit amount and the second error bit amount.

9. The memory storage device of claim 8, wherein the memory control circuit unit is further configured to obtain an index corresponding to the first physical unit group, wherein the index reflects the physical erasing unit to be scanned in the first physical unit group, and the memory control circuit unit is further configured to scan all of the plurality of physical programming units in the at least one first physical erasing unit corresponding to the index according to an indication of the index to obtain the second error bit amount.

10. The memory storage device of claim 9, wherein the memory control circuit unit is further configured to correspond the index to the next physical erasing unit to be scanned after all of the plurality of physical programming units in the at least one first physical erasing unit are finished scanning.

11. The memory storage device of claim 8, wherein the memory control circuit unit is further configured to update a third read count of the first physical unit group according to a total read count of the read operation performed on the plurality of physical programming units in the first physical unit group, and the memory control circuit unit is further configured to select the physical erasing unit that is not scanned in the first physical unit group for scanning when it is determined that the second read count is greater than the second read count threshold to scan at least one first physical erasing unit in the first physical unit group in response to determining that the third read count is not greater than a third read count threshold.

12. The memory storage device of claim 8, wherein the memory control circuit unit is further configured to calculate a scan average according to the second read count threshold and a number of the plurality of physical programming units in the first physical unit group, and the memory control circuit unit is further configured to randomly generate the first read count threshold according to the scan average.

13. The memory storage device of claim 8, wherein the memory control circuit unit is further configured to determine whether the first error bit amount is greater than a first error threshold, and the memory control circuit unit is further configured to copy a data stored in the currently read physical erasing unit to other physical erasing units in response to determining that the first error bit amount is greater than the first error threshold.

14. The memory storage device of claim 8, wherein the memory control circuit unit is further configured to determine whether the second error bit amount is greater than a second error threshold, and the memory control circuit unit is further configured to copy a data stored in the at least one first physical erasing unit to other physical erasing units in response to determining that the second error bit amount is greater than the second error threshold.

15. A memory control circuit unit configured to control a rewritable non-volatile memory module, wherein the memory control circuit unit comprises:

a host interface configured to be coupled to a host system;

a memory interface configured to be coupled to the rewritable non-volatile memory module, wherein the rewritable non-volatile memory module comprises a plurality of physical unit groups, each of the plurality of physical unit groups comprises a plurality of physical erasing units, each of the plurality of physical erasing units comprises a plurality of physical programming units, and the plurality of physical unit groups comprise a first physical unit group; and a memory management circuit coupled to the host interface and the memory interface, wherein the memory management circuit is configured to perform a read operation on the plurality of physical programming units, the memory management circuit is further configured to update a first read count and a second read count of the first physical unit group according to a total read count of the read operation performed on the plurality of physical programming units in the first physical unit group, the memory management circuit is further configured to determine whether the first read count is greater than a first read count threshold, and scan at least one first physical programming unit in the currently read physical erasing unit in response to determining that the first read count is greater than the first read count threshold to obtain a first error bit amount, the memory management circuit is further configured to determine whether the second read count is greater than a second read count threshold, and scan all of the plurality of physical programming units in at least one first physical erasing unit in the first physical unit group in response to determining that the second read count is greater than the second read count threshold to obtain a second error bit amount, wherein the second read count threshold is greater than the first read count threshold, and the memory management circuit is further configured to perform a read disturb prevention operation according to at least one of the first error bit amount and the second error bit amount.

16. The memory control circuit unit of claim 15, wherein the memory management circuit is further configured to obtain an index corresponding to the first physical unit group, wherein the index reflects the physical erasing unit to be scanned in the first physical unit group, and the memory management circuit is further configured to scan all of the plurality of physical programming units in the at least one first physical erasing unit corresponding to the index according to an indication of the index to obtain the second error bit amount.

17. The memory control circuit unit of claim 16, wherein the memory management circuit is further configured to correspond the index to the next physical erasing unit to be scanned after all of the plurality of physical programming units in the at least one first physical erasing unit are finished scanning.

18. The memory control circuit unit of claim 15, wherein the memory management circuit is further configured to update a third read count of the first physical unit group according to a total read count of the read operation performed on the plurality of physical programming units in the first physical unit group, and the memory management circuit is further configured to select the physical erasing unit that is not scanned in the first physical unit group for scanning when it is determined that the second read count is greater than the second read count threshold to scan at least one first physical erasing unit in the first physical unit group in response to determining that the third read count is not greater than a third read count threshold.

19. The memory control circuit unit of claim 15, wherein the memory management circuit is further configured to calculate a scan average according to the second read count threshold and a number of the plurality of physical programming units in the first physical unit group, and the memory management circuit is further configured to randomly generate the first read count threshold according to the scan average.

20. The memory control circuit unit of claim 15, wherein the memory management circuit is further configured to determine whether the first error bit amount is greater than a first error threshold, and the memory management circuit is further configured to copy a data stored in the currently read physical erasing unit to other physical erasing units in response to determining that the first error bit amount is greater than the first error threshold.

21. The memory control circuit unit of claim 15, wherein the memory management circuit is further configured to determine whether the second error bit amount is greater than a second error threshold, and the memory management circuit is further configured to copy a data stored in the at least one first physical erasing unit to other physical erasing units in response to determining that the second error bit amount is greater than the second error threshold.

\* \* \* \* \*